2 Sheets—Sheet 1.
F. C. TREADWELL Jr.
OVEN.
No. 11,578.            Patented Aug. 22, 1854.
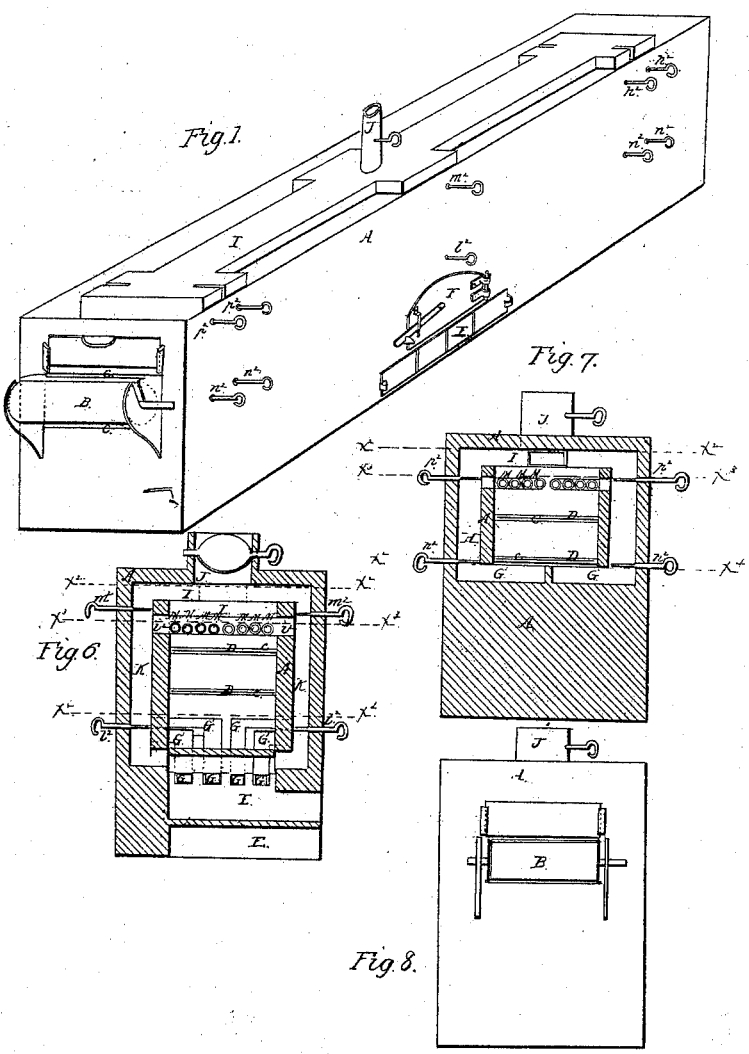

2 Sheets—Sheet 2.
F. C. TREADWELL Jr
OVEN.
No. 11,578.  Patented Aug. 22, 1854.
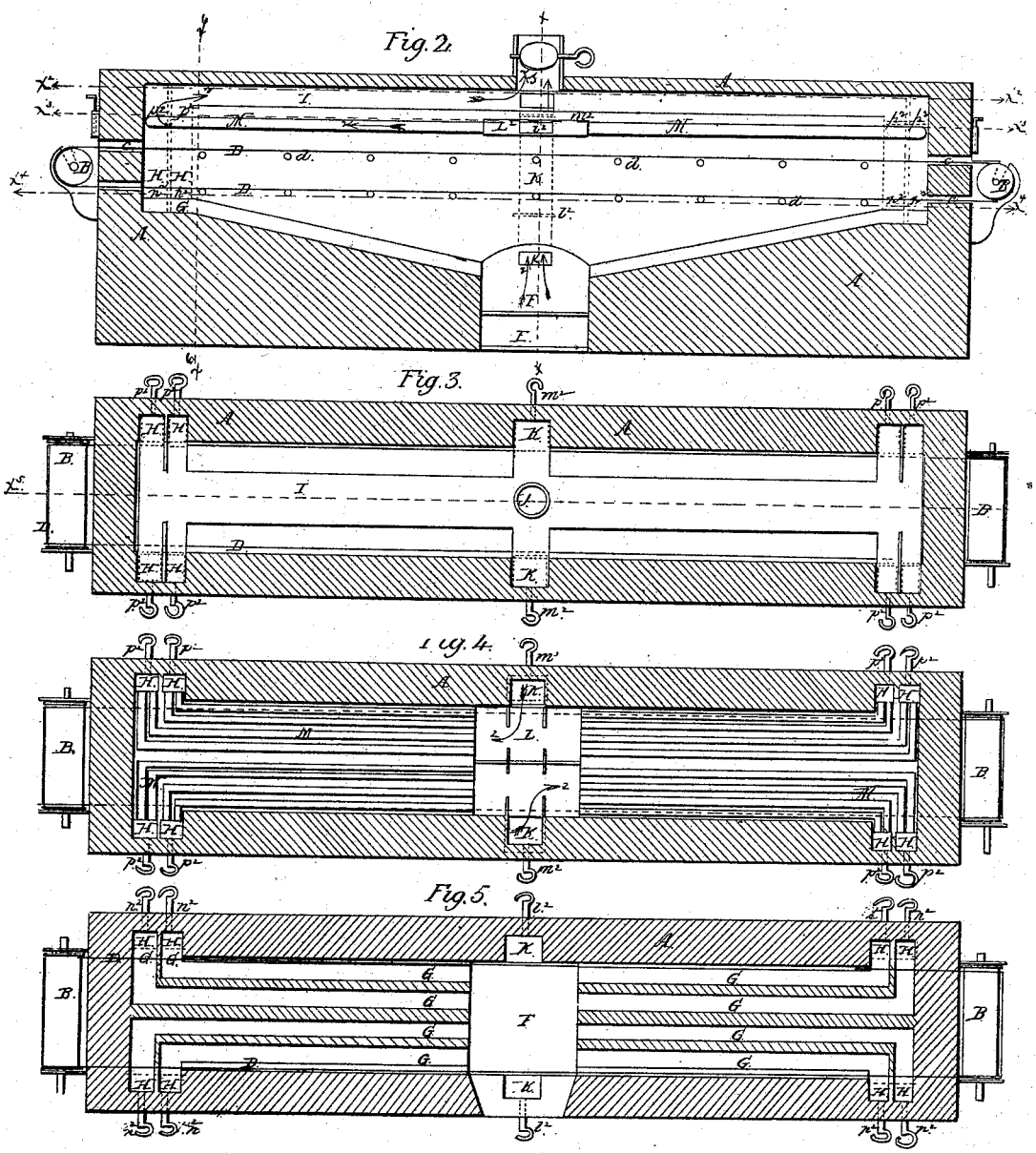

UNITED STATES PATENT OFFICE.

FRANCIS C. TREADWELL, JR., OF NEW YORK, N. Y.

OVEN.

Specification of Letters Patent No. 11,578, dated August 22, 1854.

*To all whom it may concern:*

Be it known that I, FRANCIS C. TREADWELL, Jr., of the city, county, and State of New York, have invented certain new and useful Improvements in the Construction of Self Feeding and Discharging Ovens, or what is commonly known by the trade as "perpetual ovens," for baking bread, crackers, &c., but more especially the fancy biscuits which require great nicety in baking, and consequently great facilities of damper and flue arrangements to control and apply the heat from the furnace to the upper and lower surfaces of the biscuits to bake them.

The nature of my invention consists in applying the heat radiating from the furnace and flues, (arranged and constructed as hereinafter set forth,) in such manner to the biscuits, or other articles to be baked, as they are carried through the length of the oven on an endless band of wire cloth, or other suitable material, that they will be thoroughly baked on both sides, when they are discharged from the oven. To accomplish this perfection of baking, that is, giving the biscuit or other article a delicate crisp brown and not scorching one side, and leaving the other of an ashy paleness, or of drying out the biscuit, instead of baking it, is a great desideratum among the "trade," not only because the appearacne of the article being more saleable, but because of the universally admitted fact that biscuits, (particularly tea biscuits) when crisped with a delicate brown is beyond all measure so superior to the half dried out or imperfectly baked biscuit, that though they may be of the same dough before put in the oven, yet no one not aware of the fact could ever suspect such to be the case. The various thicknesses of the different styles of biscuits, as well as the difference in their component parts require not only great differences in temperature, but also a change in locality of heat. Some require the heat principally from the bottom, others from the top, others again, evenly divided, and often the oven is required to bake several varieties in one day, and of quite opposite component parts, and as the oven has been surcharged with heat for one variety in one direction, it is important, in taking an opposite variety that the arrangement of flues be such as to give an opposite direction to the heat, and thereby keep up a continuous use of the oven, and not be compelled to wait till the oven cools down before it could be used. By my arrangement of flues and dampers this is accomplished. All the heat from the furnace can be applied to the top or bottom of the article to be baked, at pleasure, or may be divided so as to be applied in various degrees of temperature simultaneously at top and bottom, or the entire heat of the furnace may be discharged directly to the chimney and thereby instantly reduce the temperature of the oven should it be too great for the baking operation.

The feeding into the oven by placing the drums around which the endless wire cloth band passes is important, as it allows the oven doors being kept almost entirely closed the whole time, which is a saving of heat and would not be the case, if the articles were to be set into the oven by a "peel," as must be the case where the drums are placed within the oven; it also saves the labor of a man, because the boy who picks up the work to arrange on the pans, can place the pans directly on the endless band to be carried into the oven by its rotation, and as it comes out of the oven at the opposite end discharges itself which could not be done with pans if the discharge were effected inside of the oven. But to describe my invention more particularly I will refer to the accompanying drawings forming a part of this schedule the same letters of reference wherever they occur referring to the same parts.

Figure 1 is a perspective view of the oven having the upper shell removed, to show the connecting flue. Fig. 2 is a cut section of the oven through the red dotted line $x^5$, $x^5$, Fig. 3. Fig. 3 is a plan view of the oven showing the connecting flue through the red dotted lines $x^2$, $x^2$, in Figs. 2, 6 and 7. Fig. 4 is a plan view of the oven, showing the upper radiating flues, through the red dotted lines $x^3$, $x^3$, in Figs. 2, 6 and 7. Fig. 5 is a plan view of the oven showing the lower radiating flues, through the red dotted lines $x^4$, $x^4$, Figs. 2, 6, and 7. Fig. 6 is a transverse cut section of the oven, through the red dotted line $x$, $x$, Fig. 2. Fig. 7 is a transverse cut section of the oven, through the red dotted line $x^6$, $x^6$, Fig. 2. Fig. 8 is an end elevation of the oven showing the drum over which the endless band passes.

Letters A, A, represent the shell or brick work setting of the furnace and flues of the oven. It would be premised that the oven (except the upper radiating pipes) will be made of brick work, having the bottom, side, and connecting flues made in the brick work. The dimensions of the oven is intended to be forty feet long, by five feet wide inside, and about twelve feet high through the line of the ash pit.

Letters B, B, are drums arranged at the ends of the oven. Around these drums and running through openings $c$, $c$, in the ends of the oven is an endless band D. This band is made of wire cloth or other suitable material, and rests on rollers ($d$, &c.) placed across the interior of the oven, so as to support the pans of biscuit as they pass through the oven, by means of the rotation of the band. Letter E, is the ash pit, and F, the furnace situated midway between the ends of the oven. The object of this is to have the body of the heat in the oven, and not have too great lengths of flue passage ways, as would be the case with all ovens having the furnace placed at ends of oven.

Letter G, G, are a series of flues extending from the sides of the furnace. These flues have a gradual ascending elevation from the spring of the arch of the furnace, and terminate in side flues H, H, at each end of the oven. The upper ends of these flues terminate in a top connecting flue I, leading directly to the chimney J, which is elevated from the center of the connecting flue in a vertical line over the furnace. Letters K, K, are also side flues leading from the furnace directly, and terminating at their upper ends in the connecting flue I, and also having openings ($i^2$) communicating with the distributing chamber L, into which the flame and escaping gases from the furnace is directed, when the damper $l^2$, is open, and the upper damper $m^2$, is closed, thereby causing the gases from the furnace to pass through the series of upper radiating pipes M, connected with the distributing chamber at each side, and terminating in the upper end of the side flues H, H, and thence into the connecting flue I, to discharge, at the chimney. In the side flues H, H, are divisions. The object of dividing the flues is to cause the flame and gases from the furnace in passing through the lower flues G, G, or upper radiating pipes M, M, to be more evenly distributed over the surface of the oven, by means of the regulating dampers $n^2$ and $p^2$, in the flues H, H.

The operation of my oven is, that when I first start my fire in the furnace I close the dampers $p^2$ and $n^2$, in the end vertical flues H, H, and open the dampers $l^2$ and $m^2$, in the flue K, which gives a direct draft from the furnace to the chimney in the direction of the arrows. Having got the fire well ignited, I then close the dampers $l^2$ and $m^2$, in the flue K, and open the dampers $n^2$ and $p^2$, in the vertical flues H, H, when the flame and escaping gas from the furnace passes through the bottom flues G, into the vertical flues H, and thence into the connecting flue I, to the chimney J, and thence to the open atmosphere. Should there be too much heat at the bottom, and not enough on top, I open $l^2$, in the lower end of the center flues K, also open $p^2$, in the upper ends of the flues H, and close the dampers $n^2$, in the lower end of the flue H, to cause the flame and gases from the furnace to take the direction of the arrows (marked 2) through the flue K, out at the opening $i^2$, into the distributing chamber L, and thence through the radiating pipes M, into the upper ends of the vertical flues H, and into the connecting flue I, and then escaping into the chimney.

By operating the dampers the escaping flame and gases from the furnace may be divided so as to operate simultaneously through the upper and lower horizontal flues, or by closing the lower dampers $n^2$ at one end of the oven, and opening $l^2$, and $p^2$, at the opposite end of the oven, an excess of heat may be obtained on top of the article to be baked as it is leaving the oven on the endless band.

By this combination of flues and dampers, the following important results are obtained. First, the entire mass of heat of the furnace is in the middle of the oven, and therefore all radiation or conduction or absorption of heat by the brick work is given back to the oven. Second, that the furnace being in the middle of the oven admits of shorter flues, and consequently more direct application of the heat. Third, that the heat may be applied alternately at top and bottom of the article to be baked, or simultaneously at top and bottom, or divided, so as to be half at one end of the oven at the top, and the other half at the other end of the oven at the bottom, and thus giving the operator the entire control of the baking operation by the simple adjustment of the dampers in the flues from one furnace.

Having now described my oven and its operation I will proceed to state what I claim and desire to secure by Letters Patent.

What I claim is—

The use of the combination of the furnace, flues and dampers, substantially as hereinbefore set forth, in combination with an endless band running through the oven, and over drums placed outside of it, for the purpose of making a perpetual baking oven substantially as described.

F. C. TREADWELL, Jr.

Witnesses:
CHARLES L. BARRITT,
JOSEPH BRIDGHAM.